(12) United States Patent
Leroy et al.

(10) Patent No.: US 12,488,162 B1
(45) Date of Patent: Dec. 2, 2025

(54) OPTIMIZATION OF PHOTOVOLTAIC SOILING MODEL PARAMETERS

(71) Applicant: BrightNight Power LLC, West Palm Beach, FL (US)

(72) Inventors: Cédric Leroy, Austin, TX (US); Marc Hermann, West Palm Beach, FL (US)

(73) Assignee: BRIGHTNIGHT POWER LLC, West Palm Beach, FL (US)

( * ) Notice: Subject to any disclaimer, the term of this patent is extended or adjusted under 35 U.S.C. 154(b) by 0 days.

(21) Appl. No.: 19/045,371

(22) Filed: Feb. 4, 2025

(51) Int. Cl.
*G06F 30/20* (2020.01)

(52) U.S. Cl.
CPC .................................... *G06F 30/20* (2020.01)

(58) Field of Classification Search
CPC ........................................................ G06F 30/20
USPC ............................................................ 703/1, 18
See application file for complete search history.

(56) References Cited

U.S. PATENT DOCUMENTS

| | | | |
|---|---|---|---|
| 10,607,162 B2 | 3/2020 | Philip et al. | |
| 10,615,745 B1* | 4/2020 | Alasfour | H02S 40/10 |
| 10,673,372 B2 | 6/2020 | Azad et al. | |
| 2016/0104084 A1* | 4/2016 | Philip | H02S 50/00 |
| | | | 705/7.13 |
| 2019/0181793 A1* | 6/2019 | Azad | H02S 10/00 |

FOREIGN PATENT DOCUMENTS

| | | |
|---|---|---|
| CN | 110161860 | 8/2019 |
| IN | 37/2020 | 9/2020 |

OTHER PUBLICATIONS (Modeling of photovoltaic soiling loss as a function of environmental variables (Year: 2017).*
Ameur et al. (Forecast modeling and performance assessment of solar PV systems (Year: 2020).*
"Optimal Scheduling of PV Panel Cleaning and Policy Implications Considering Uncertain Dusty Weather Conditions in the Middle East", https://www.mdpi.com/2079-8954/12/10/418.
Optimum cleaning schedule of photovoltaic systems based on levelised cost of energy and case study in central Mexico, https://www.sciencedirect.com/science/article/abs/pii/S0038092X20309154.

(Continued)

*Primary Examiner* — Andre Pierre Louis
(74) *Attorney, Agent, or Firm* — FOLEY & LARDNER LLP

(57) ABSTRACT

A method for optimizing a parameter set for a photovoltaic (PV) soiling model including executing the PV soiling model with a first plurality of parameter sets using as input wash data to generate first predicted energy loss data, calculating first losses based on a difference between the first predicted energy loss data and time-series sensor data, executing a parameter-tuning model using as input the first plurality of parameter sets to generate a second plurality of parameter sets, executing the PV soiling model with the second plurality of parameter sets using as input the wash data to generate second predicted energy loss data, calculating second losses based on the second predicted energy loss data and the time-series sensor data, and, in response to a loss of the second losses being below a threshold, generating a data structure including a parameter set corresponding to the loss.

20 Claims, 9 Drawing Sheets

(56) References Cited

OTHER PUBLICATIONS

"Predictive modeling of photovoltaic system cleaning schedules using machine learning techniques", https://www.sciencedirect.com/science/article/abs/pii/S0960148124022171.

SmartHelio—"AI-based dynamic cleaning schedule for solar PV panels: A data driven cleaning approach", https://smarthelio.com/dynamic-cleaning-schedule-real-time-prediction-of-when-and-where-to-clean/.

* cited by examiner

OPTIMIZATION OF PHOTOVOLTAIC SOILING MODEL PARAMETERS

BACKGROUND

Photovoltaic (PV) arrays generate electricity from solar radiation. Soiling of PV arrays, such as buildup of dust on PV arrays, reduces the power output of PV arrays. Forecasts of PV array output for controlling assets of a power plant can be inaccurate due to soiling of PV arrays and the corresponding reduction in output.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

DETAILED DESCRIPTION

Figure 1:
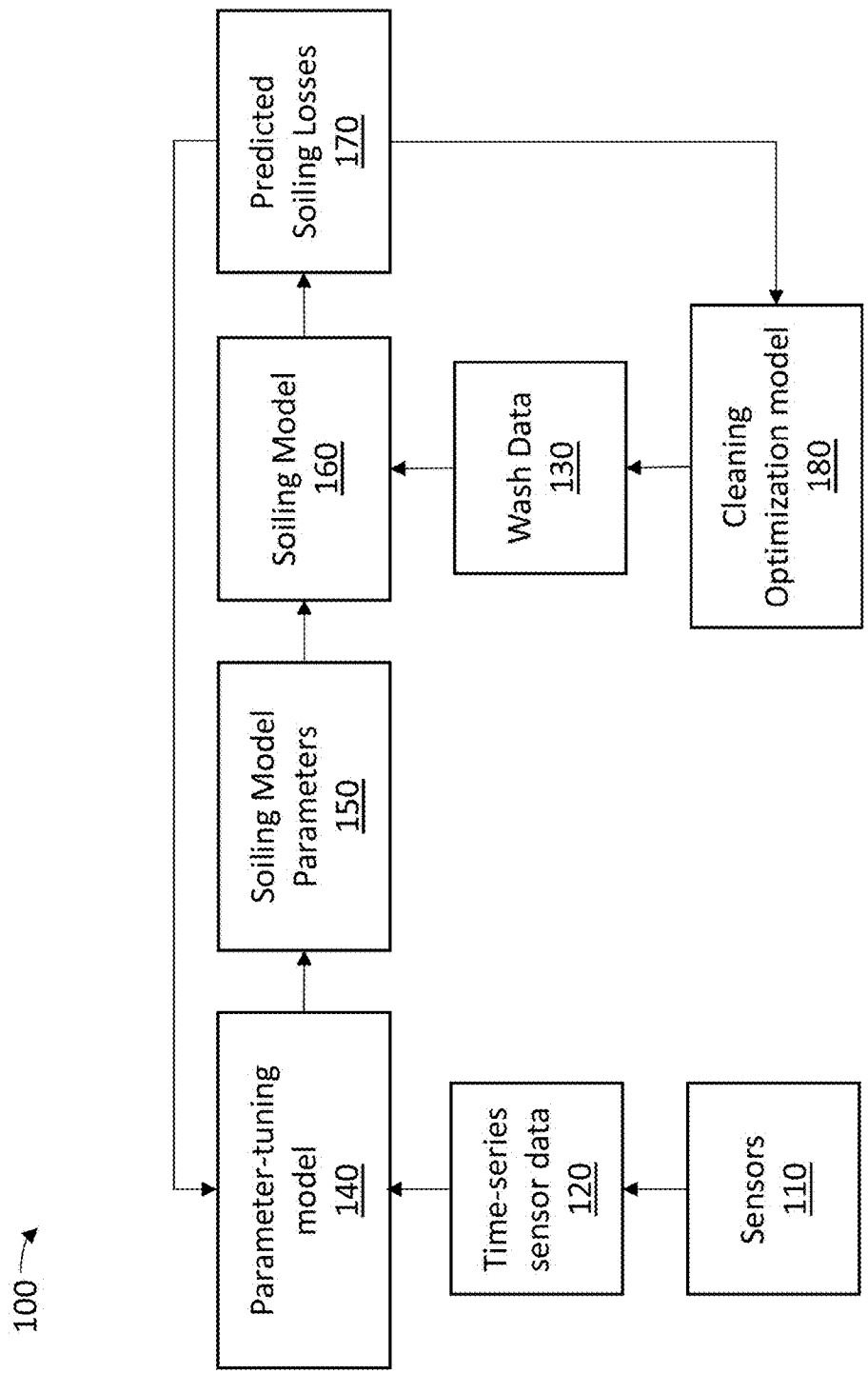
FIG. 1 is a block diagram of an example computing system for optimizing a photovoltaic (PV) soiling model.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Soiling losses reduce output of PV arrays, as a portion of solar irradiance is blocked by the soiling (e.g., dust, debris, etc. on the PV arrays). Accurate prediction of PV array output is important for control of renewable energy assets to improve efficiency and reduce equipment degradation. However, predicting soiling buildup rates for PV arrays is a difficult process, as different geographic locations have different characteristics that affect PV soiling, such as soil composition, grain size, humidity, wind speed, and vegetation coverage. Embodiments and implementations discussed herein provide for efficient optimization of soiling model parameters for predicting soiling losses by adjusting the soiling model parameters based on a loss between predicted soiling losses and actual soiling losses. This approach allows for accurate prediction of soiling losses without analysis of the many and varied factors affecting soiling buildup in a location. By using a parameter-tuning model to improve the soiling model parameters, optimal or semi-optimal parameters can be determined in an efficient manner.

Moreover, once soiling model parameters have been determined that cause the soiling model to accurately predict soiling losses, the soiling model can be used to optimize cleaning events for PV arrays by executing the soiling model using different combinations of cleaning events. A cleaning optimization model can be used to efficiently determine an optimal or semi-optimal combination of cleaning events to efficiently increase an output of the PV arrays.

FIG. 1 is a block diagram of an example system 100 for optimizing a photovoltaic (PV) soiling model 160. The system 100 optimizes parameters of the soiling model 160 to provide accurate predictions of soiling losses. The system 100 optimizes wash schedules to optimize power generation by PV arrays. In this way, the system 100 can improve the design, implementation, control, and maintenance of PV systems to increase efficiency of power generation.

The system 100 includes sensors 110. The sensors 110 can include sensors of meteorological stations (met stations) adjacent PV arrays to capture data corresponding to the PV arrays. The sensors 110 can include soiling sensors, irradiance sensors, rainfall sensors, humidity sensors, and other sensors. The sensors 110 can provide time-series sensor data 120 associated with a location of the sensors 110. The sensors 110 can be in a location of a PV plant, or a location of a potential PV plant such that the time-series sensor data 120 can be used to optimize the soiling model 160 for the location.

The time-series sensor data 120 can be used to calculate soiling loss data. The soiling loss data represents a loss in power that could be generated by a PV array due to soiling of the PV array. In an example, the soiling loss data includes soiling losses due to buildup of dust on a PV array, indicating a percentage of theoretical output of the PV array that is lost due to the reduction in irradiance on the PV array due to the dust. In an example, the soiling loss data includes soiling losses due to dust on the PV array. The soiling loss data can be calculated based on data in the time-series sensor data 120. In an example, the soiling loss data is calculated based on a difference between an irradiance measured by an irradiance sensor that experiences no soiling (e.g., due to cleaning, geometry and/or other factors) and an irradiance measured by an irradiance sensor that experiences soiling. In an example, the soiling loss data is calculated based on a difference between a theoretical output of a PV array calculated using an irradiance measured by an irradiance sensor and an actual output of the PV array. In some implementations, the soiling loss data is calculated by an intermediate computing device that receives the time-series sensor data 120 and calculates the soiling loss data.

The soiling model 160 can be used to predict soiling losses for the location. The soiling model 160 can generate predicted soiling losses 170. The predicted soiling losses 170 can include predictions of soiling losses for past, current, and/or future time periods. The predicted soiling losses 170 can be used to modify and/or generate predicted PV outputs. In an example, the predicted soiling losses 170 include percentages of irradiance lost and/or power output lost due to soiling, which percentages are used to modify a prediction of PV output. The soiling model 160 can use a parameter set to configure the soiling model and be executed using as input rainfall data to output the predicted soiling losses 170. In an example, the soiling model is the Kimber soiling model.

The soiling model 160 is executed using as input soiling model parameters 150 and wash data 130. In some implementations, the soiling model 160 is executed using as input the soiling model parameters 150, the wash data 130, and tilt data (i.e., tilt of PV arrays). The soiling model parameters 150 determine a configuration of the soiling model 160. The soiling model parameters 150 can include a soiling buildup rate (e.g., for each month), a cleaning threshold defining an amount of rain required for a cleaning event, a rain accumulation period defining a time interval for accumulating rainfall to compare against the cleaning threshold, a grace period defining a number of days after a rainfall event during which no soiling occurs due to residual moisture (e.g., ground is damp and no dust is picked up by wind), and/or initial soiling defining an initial soiling level on PV arrays. The soiling model parameters 150 can be specific to a location, or can include different sets of parameters for different locations.

The wash data 130 can include rainfall data and manual cleaning data. The rainfall data can include historical and/or forecasted rainfall data. The rainfall data can be provided by the sensors 110 or from a rainfall database. The rainfall data, the soiling model parameters 150, and the time-series sensor data 120 correspond to a same location to accurately model soiling losses on PV arrays at the location using the soiling model 160. Different sets of rainfall data, soiling model parameters, and time-series sensor data can be used to optimize the soiling model 160 for different locations. The manual cleaning data defines manual cleaning events when soiling is removed from PV arrays without rainfall, such as by washing the PV arrays. The manual cleaning events can include manual cleaning processes as well as automated cleaning processes, such as cleaning by automatic sprinkler systems or automatic pneumatic cleaning systems. The manual cleaning data can include any intervention to clean PV arrays, separate from natural cleaning of the PV arrays caused by rainfall.

A parameter-tuning model 140 can generate and/or optimize the soiling model parameters 150. The parameter-tuning model 140 can generate the soiling model parameters 150 using as input the time-series sensor data 120 and the predicted soiling losses 170. In some implementations, the parameter-tuning model 140 initializes the soiling model parameters 150 with random (pseudo-random) parameters or user-provided parameters and compares the predicted soiling losses 170 to the time-series sensor data 120 (including actual soiling losses) to determine a loss between the predicted soiling losses 170 and the actual soiling losses, or an accuracy of the soiling model 160 using the current soiling model parameters 150. The parameter-tuning model 140 compares the loss to a predetermined loss threshold, or compares the accuracy to a predetermined accuracy threshold to determine whether to further optimize the soiling model parameters 150. If the loss is above the predetermined loss threshold, or the accuracy is below the predetermined accuracy threshold, the parameter-tuning model 140 uses the loss or accuracy to modify the current soiling model parameters 150 or generate new soiling model parameters 150. In this way, the parameter-tuning model 140 can iteratively improve the soiling model parameters 150 to improve the accuracy of the soiling model 160 and reduce a loss between the predicted soiling losses 170 and the actual soiling losses.

In some implementations, the parameter-tuning model 140 improves the soiling model parameters over a predetermined number of iterations.

In some implementations, the parameter-tuning model 140 initializes the soiling model parameters 150 with a plurality of parameter sets, where each parameter set includes the parameters for configuring the soiling model 160. The soiling model 160 is executed using as input each parameter set to generate corresponding predicted soiling losses 170, and a corresponding loss is calculated based on a difference between the corresponding predicted soiling losses 170 and the actual soiling losses. The parameter-tuning model 140 ranks the plurality of parameter sets based on the calculated losses to select a subset of the plurality of parameter sets having lowest corresponding losses. The parameter-tuning model 140 is executed using as input the selected subset to generate a new plurality of parameter sets of soiling model parameters 150 which are used in executing the soiling model 160 to generate new corresponding predicted soiling losses 170. The parameter-tuning model 140 can introduce randomness into the generation of the new plurality of parameter sets to avoid local minima. The new corresponding predicted soiling losses 170 are used to calculate losses based on a difference from the actual soiling losses to evaluate the new plurality of parameter sets. The parameter-tuning model 140 iteratively generates subsequent parameter sets based on prior parameter sets ranked according to their losses (difference from the actual soiling losses). Once a loss for a parameter set is below a predetermined threshold, the parameter-tuning model 140 generates a data structure including the parameter set. The data structure can be a configuration file for the soiling model 160 for execution of the soiling model 160 in predicting PV soiling losses in the location corresponding to the sensors 110. In this way, the parameter-tuning model 140 can optimize the soiling model parameters 150 for the location. The data structure can be a CSV file, a JSON file, a text file, or any data structure for storing the selected parameter set.

In some implementations, the parameter-tuning model 140 includes a derivative-free optimization algorithm. In an example, the parameter-tuning model 140 includes a particle swarm optimization (PSO) algorithm. In some implementations, the parameter-tuning model 140 includes a machine-learning model trained to adjust the soiling model parameters 150 to minimize a loss between the predicted soiling losses 170 and the actual soiling losses.

In some implementations, the loss calculated based on the difference between the predicted soiling losses 170 and the actual soiling losses is an absolute average difference between a predicted percentage energy loss and a measured percent energy loss. In an example, the predicted soiling losses 170 include soiling losses over the course of a year, and the loss is calculated by averaging an absolute difference between the predicted soiling losses 170 and the actual soiling losses for each day. In some implementations, the loss is calculated using weighted values. In an example, losses in summer months are weighted higher than losses in winter months, as losses in summer months represent greater absolute differences in power output due to higher irradiance in summer months. In an example, losses in winter months are weighted higher than losses in summer months, as losses in winter months represent greater proportions of power output due to lower irradiance in winter months.

In some implementations, the soiling model parameters 150 include at least one of a soiling buildup rate, a rain cleaning threshold, a rain accumulation period, and a grace period, as discussed herein. The parameter-tuning model 140 can adjust one or more or more of the parameters using various rules. In an example, the parameter-tuning model 140 adjusts values of the soiling buildup rate based on adjacent values or an average value. In an example, the soiling buildup rate includes twelve values for monthly soiling buildup rates for each month in a year, and the parameter-tuning model 140 adjusts the value for each month based on the values of the neighboring months, or the average yearly soiling buildup. In this way, the parameter-tuning model 140 prevents sudden changes in the values of the soiling buildup rate across different months.

The soiling model 160 can be executed using the optimized soiling model parameters 150 (e.g., the selected parameter set) to generate the predicted soiling losses 170 for applying to predicted PV output. The predicted soiling losses 170 can be used to adjust (i.e., reduce) the predicted PV output to take into account losses due to soiling. In an example, the predicted soiling losses 170 include a percentage loss of irradiance on PV arrays which is used to calculate a predicted output of the PV arrays using irradiance data. In an example, the predicted soiling losses 170 include a percentage loss of PV output which is used to calculate a predicted output of the PV arrays using a preliminary predicted PV output.

The soiling model 160 can be executed using the optimized soiling model parameters 150 (e.g., the selected parameter set) to optimize manual cleaning events. In some implementations, the soiling model 160 is executed multiple times using modified wash data 130 each time to determine which wash data 130 (i.e., which cleaning events) results in the lowest predicted soiling losses 170. In an example, the soiling model 160 is executed ten times using the optimized soiling model parameters 150 and ten different combinations of cleaning dates to determine which combination of cleaning dates results in the lowest predicted soiling losses 170. In this way, the system 100 can generate a recommendation for one or more manual cleaning events (e.g., cleaning dates) by executing the soiling model 160 using as input the modified cleaning data.

In some implementations, a cleaning optimization model 180 is used to optimize the manual cleaning events of the wash data 130. The cleaning optimization model 180 iteratively modifies the manual cleaning events based on the predicted soiling losses 170 to determine manual cleaning events that result in lowest predicted soiling losses 170. In some implementations, the cleaning optimization model 180 initializes the wash data 130 with random (pseudo-random) combinations of manual cleaning events (e.g., wash dates), the soiling model 160 is executed using as input the wash data 130 including rainfall data and the combinations of manual cleaning events to generate the predicted soiling losses 170, the cleaning optimization model 180 ranks the combinations of manual cleaning events according to the corresponding predicted soiling losses 170, and the cleaning optimization model 180 selects and/or generates new manual cleaning events based on the ranking of the combinations of manual cleaning events. In this way, the cleaning optimization model 180 can optimize the manual cleaning events to minimize the predicted soiling losses 170. In some implementations, the cleaning optimization model 180 generates a data structure including the optimized manual cleaning events. In some implementations, the data structure including the optimized manual cleaning events is provided as input to an automatic cleaning system to optimize an efficiency of the automatic cleaning system.

Figure 2:
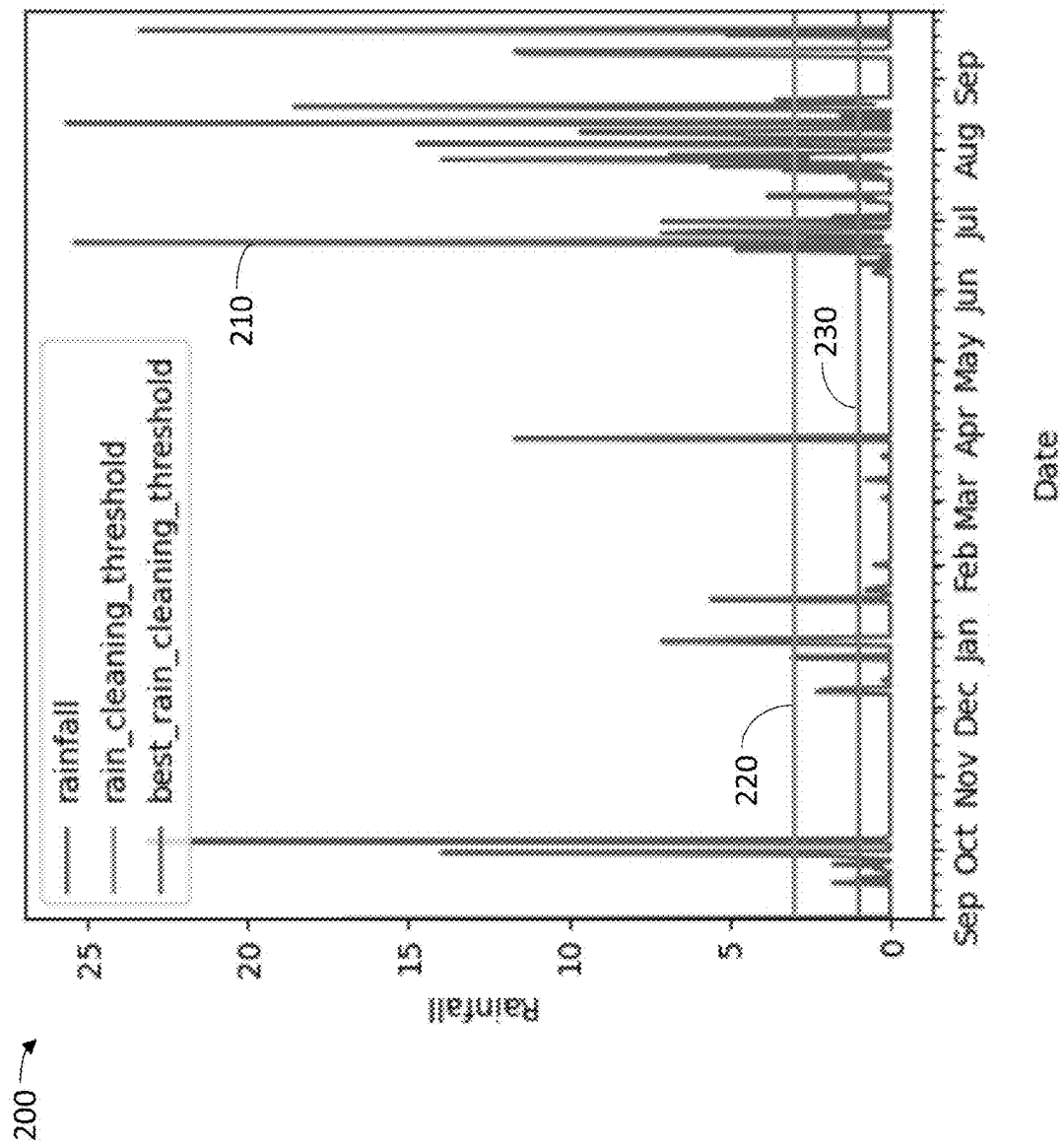
FIG. 2 is an example graph illustrating rainfall data and cleaning threshold parameters for a PV soiling model.

FIG. 2 is an example graph 200 illustrating rainfall data 210 and cleaning threshold parameters for a PV soiling model. The cleaning threshold parameters include a first rain cleaning threshold 220 and a second rain cleaning threshold 230. The first rain cleaning threshold 220 and the second rain cleaning threshold 230 can each be parameters in the soiling model parameters 150 for configuring the soiling model 160 of FIG. 1. The first rain cleaning threshold 220 and the second rain cleaning threshold 230 represent amounts of rainfall (e.g., mm) for a cleaning event, where the cleaning event removes all or a portion of soiling buildup on PV arrays. The first rain cleaning threshold 220 and the second rain cleaning threshold 230 have different values, with the first rain cleaning threshold 220 being higher than the second rain cleaning threshold 230. Thus, the first rain cleaning threshold 220 and the second rain cleaning threshold 230, when applied to the rainfall data 210, result in different cleaning events, with the first rain cleaning threshold 220 resulting in fewer cleaning events than the second rain cleaning threshold 230.

In some implementations, the first rain cleaning threshold 220 may be an initial rain cleaning threshold parameter, such as a pseudo-random parameter to initialize the soiling model parameters 150 of FIG. 1. In some implementations, the first rain cleaning threshold 220 may be generated by a deterministic algorithm that generates the first rain cleaning threshold 220 based on factors such as humidity, average wind speed, and PV array tilt. The second rain cleaning threshold 230 may be a subsequent, optimized, and/or selected rain cleaning threshold parameter generated by the parameter-tuning model 140 of FIG. 1. The second rain cleaning threshold 230 may more accurately represent how much rain is needed to clean soiling from PV arrays in the location of the PV arrays, resulting in more accurate soiling losses when applied to a soiling model than the first rain cleaning threshold 220.

Figure 3:
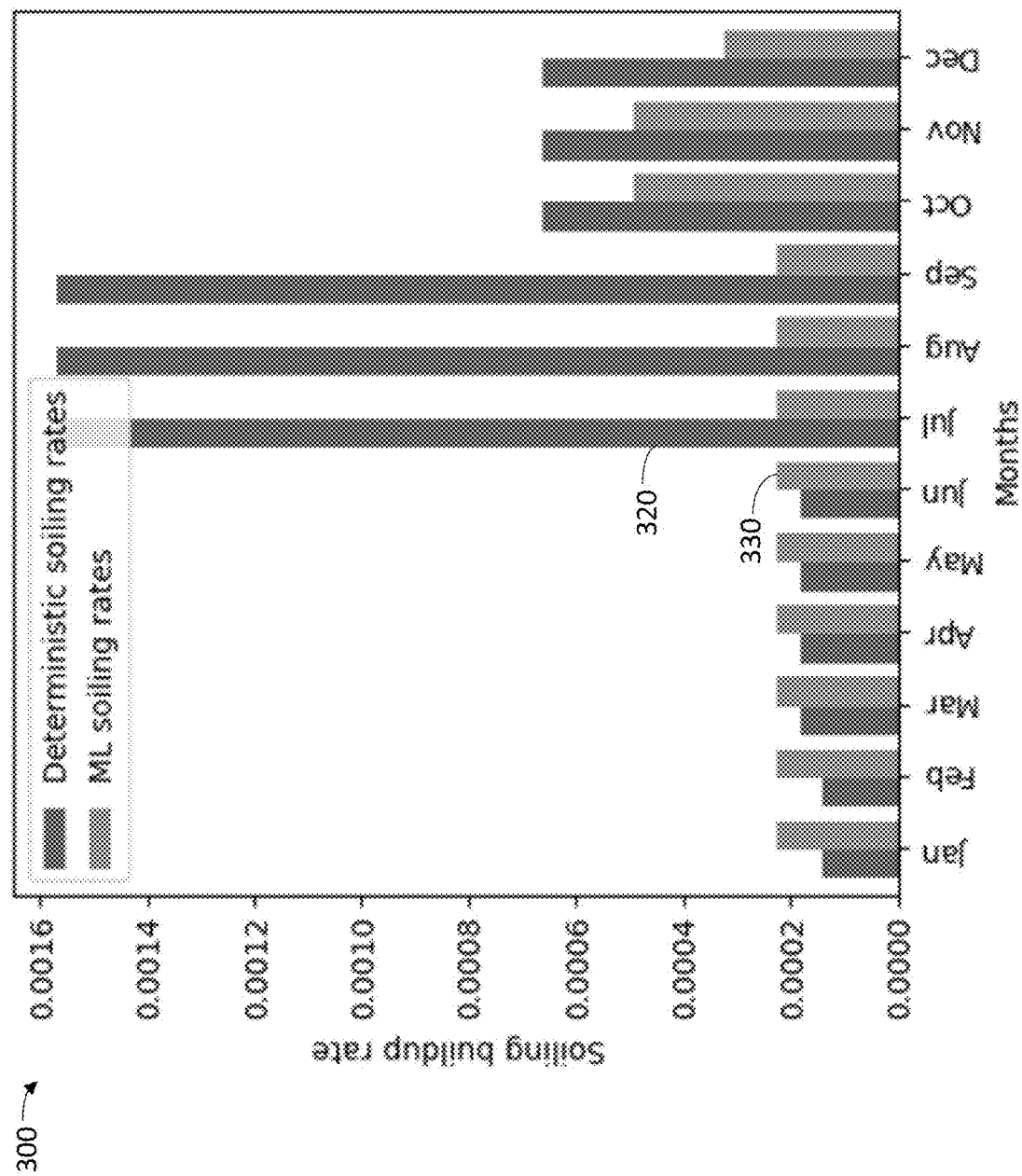
FIG. 3 is an example graph illustrating soiling rate parameter values for a PV soiling model.

FIG. 3 is an example graph 300 illustrating soiling rate parameter values for a PV soiling model, such as the soiling model 160 of FIG. 1. The soiling rate parameter values of the graph 300 include first soiling rate parameter values 320 and second soiling rate parameter values 330 for each month in a year. The first soiling rate parameter values 320 and the second soiling rate parameter values 330 are parameters for the PV soiling model that represent a monthly soiling buildup for PV arrays in a location. The first soiling rate parameter values 320 and the second soiling rate parameter values 330 represent how much soiling loss is added to a cumulative soiling loss each month. As discussed herein, cleaning events such as rainfall cleaning events and manual cleaning events reset the soiling buildup to zero, such that the cumulative soiling loss is reduced (i.e., reset) based on cleaning events and increased based on the first soiling rate parameter values 320 or the second soiling rate parameter values 330. The monthly soiling buildup may be prorated for each day or hour of the month. While the graph illustrates monthly soiling buildup rates, other time periods can be used, such as quarters, weeks, days, or hours.

In some implementations, the first soiling rate parameter values 320 may be initial soiling rate parameter values, such as pseudo-random parameter values to initialize the soiling model parameters 150 of FIG. 1 or user-provided soiling rate parameter values. In some implementations, the first soiling rate parameter values 320 may be generated by a deterministic algorithm that generates the first soiling rate parameter values 320 based on factors such as humidity, average wind speed, and PV array tilt. The second soiling rate parameter values 330 may be subsequent, optimized, and/or selected soiling rate parameter values generated by the parameter-tuning model 140 of FIG. 1. The second soiling rate parameter values 330 may be adjusted based on an average soiling rate of the second soiling rate parameter values 330 limiting differences in soiling rate parameter values between adjacent months (i.e., spread limit). The second soiling rate parameter values 330 more accurately represent soiling buildup on PV arrays in the location of the PV arrays, resulting in more accurate soiling losses when applied to a soiling model than the first soiling rate parameter values 320. The second soiling rate parameter values 330 more accurately represent the soiling buildup on the PV arrays, as the second soiling rate parameter values 330 were iteratively trained based on comparison to actual soiling data. The second soiling rate parameter values 330 more accurately represent the soiling buildup on the PV arrays due to the implementation of the spread limit, attenuating the effect of noise on the second soiling rate parameter values 330 and representing a more realistic scenario by avoiding overfitting of the second soiling rate parameter values 330 to the training data.

Figure 4:
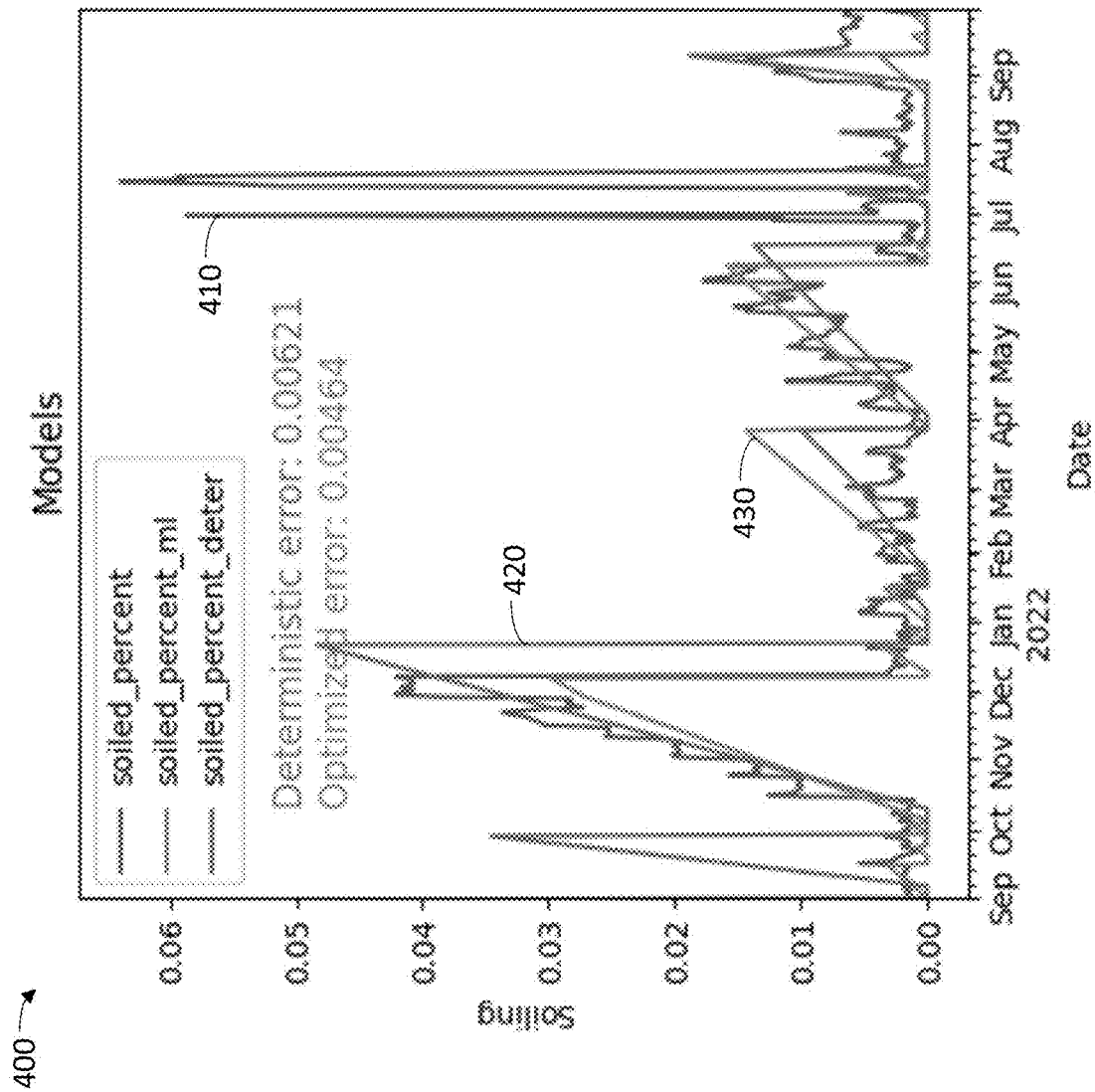
FIG. 4 is an example graph illustrating predicted soiling losses and actual soiling losses.

FIG. 4 is an example graph 400 illustrating predicted soiling losses and actual soiling losses 410. The predicted soiling losses include first soiling losses 420 and second soiling losses 430. The actual soiling losses 410, the first soiling losses 420, and the second soiling losses 430 represent percentage soiling losses to irradiance or PV output. The first soiling losses 420 may be generated by a soiling model (e.g., soiling model 160 of FIG. 1) using parameters generated by a deterministic algorithm that generates the parameters based on factors such as humidity, average wind speed, and PV array tilt. The first soiling losses 420 may be generated by a soiling model (e.g., soiling model 160 of FIG. 1) using user-provided parameters. The second soiling losses 430 may be generated by a soiling model (e.g., soiling model 160 of FIG. 1) using parameters generated by a parameter-tuning model (e.g., parameter-tuning model 140 of FIG. 1) that generates the parameters by iteratively optimizing to reduce a loss between predicted soiling losses and actual soiling losses such as the actual soiling losses 410. The parameters used by the soiling model to generate the second soiling losses 430 may more accurately reflect conditions in the location of the PV arrays than the parameters used by the soiling model to generate the first soiling losses 420, such that the second soiling losses 430 are more accurate than the first soiling losses 420. In the example graph 400, an average absolute error between the first soiling losses 420 and the actual soiling losses 410 is 0.00621, while an average absolute error between the second soiling losses 430 and the actual soiling losses 410 is 0.00464.

Figure 5:
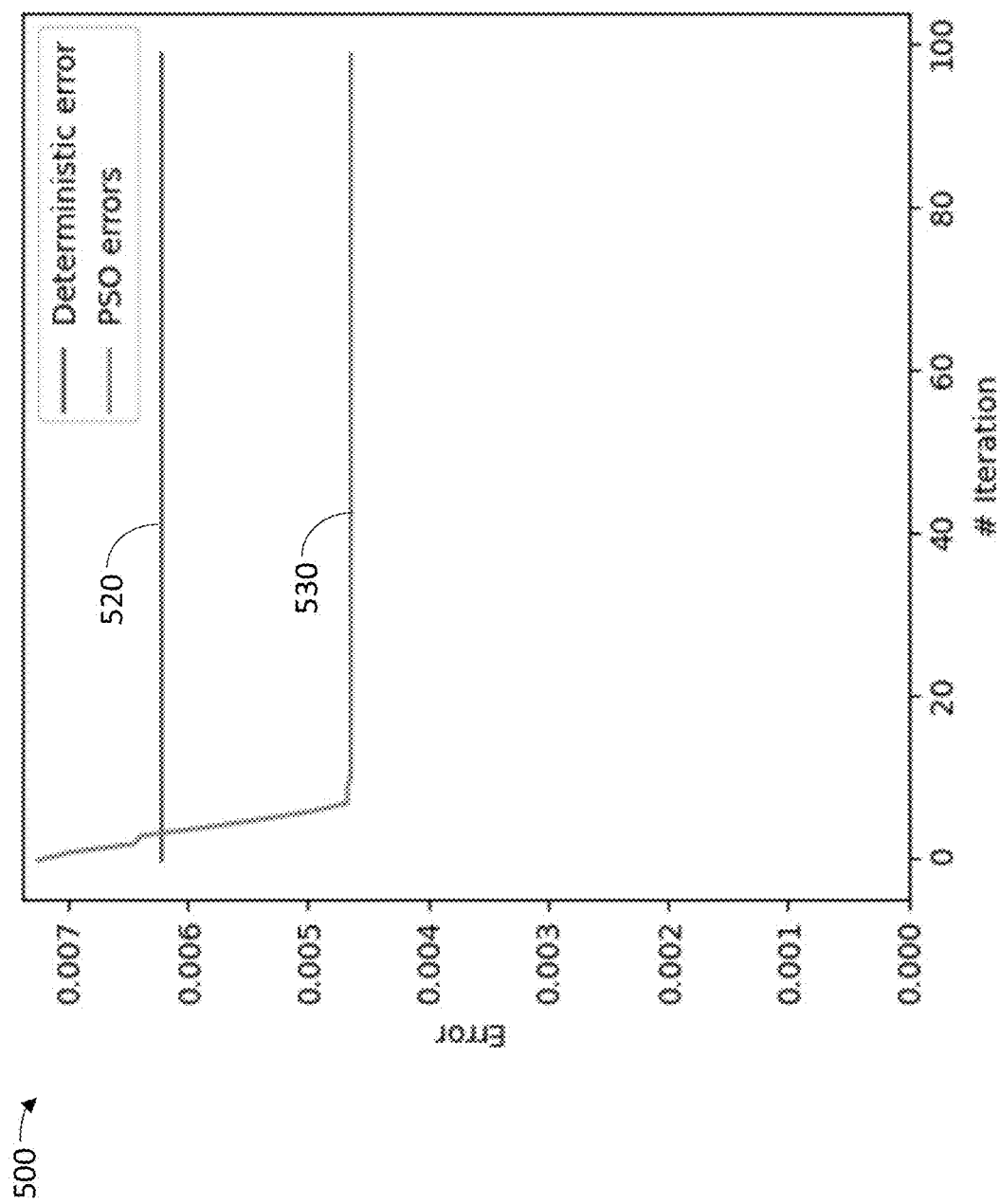
FIG. 5 is an example graph illustrating soiling loss errors.

FIG. 5 is an example graph 500 illustrating soiling loss errors. The soiling loss errors include first soiling loss errors 520 and second soiling loss errors 530. The first soiling loss errors 520 and second soiling loss errors 530 correspond to errors of the first soiling losses 420 and the second soiling losses 430, respectively, of FIG. 4. The first soiling loss errors 520 and the second soiling loss errors 530 show error over iterations, where the first soiling loss errors 520 are constant at 0.00621 as the deterministic algorithm is unchanged, while the second soiling loss errors 530 decrease over iterations as the corresponding soiling model parameters are optimized. After about ten iterations, the second soiling loss errors 530 stabilize at 0.00464, as shown in FIG. 4. The second soiling loss errors 530 may be stable at a global minimum, or at a local minimum. In an example, the parameter-tuning model that generated the parameters resulting in the second soiling loss errors 530 may be a particle swarm optimization (PSO) model.

Figure 6:
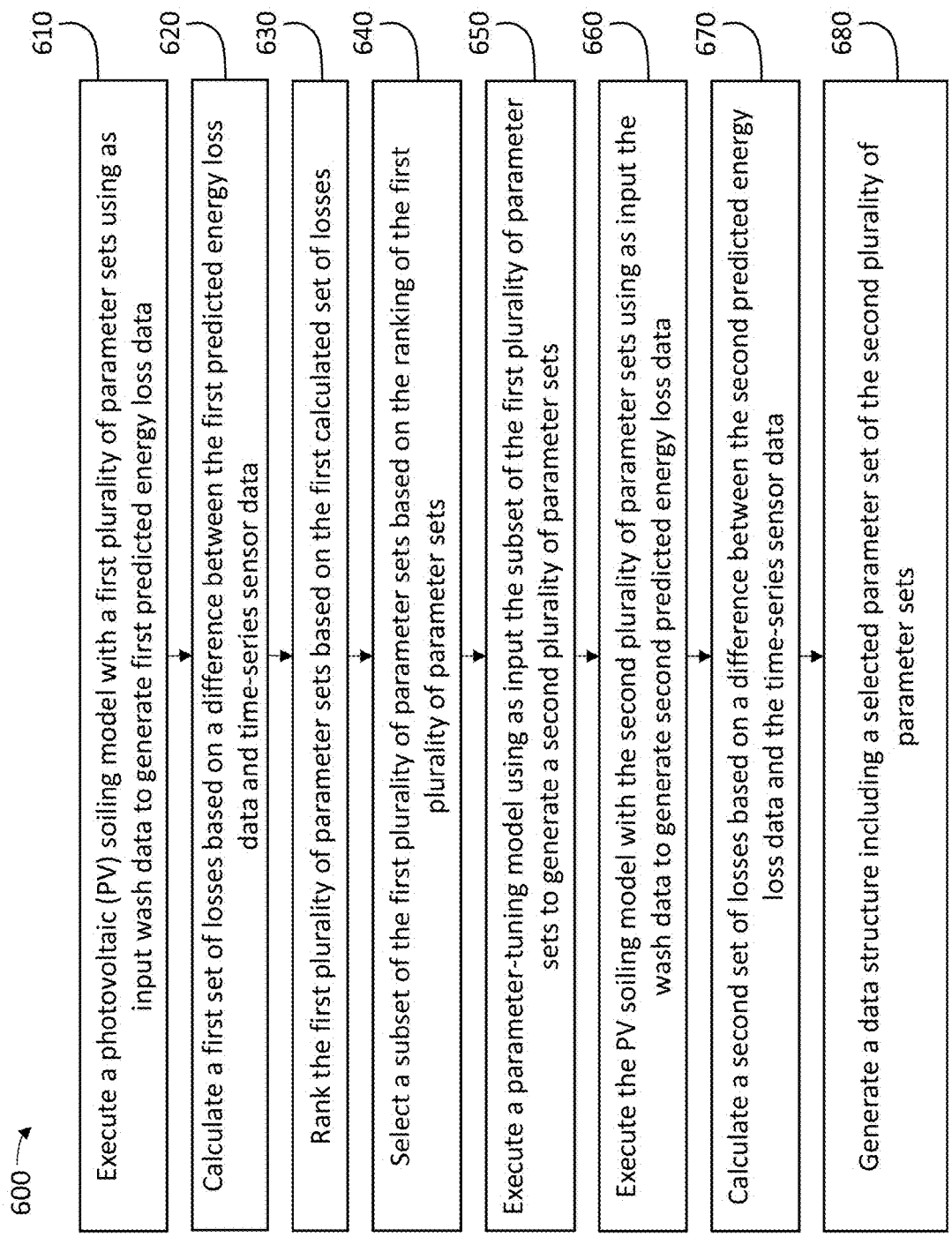
FIG. 6 is a flowchart illustrating operations of an example method for generating optimized parameters for a PV soiling model.

FIG. 6 is a flowchart illustrating operations of an example method 600 for generating optimized parameters for a PV soiling model. The method 600 may include more, fewer, or different operations than shown. The operations may be performed in the order shown, in a different order, or concurrently. The method 600 may be performed by one or more components of the system 100 of FIG. 1.

At operation 610, a PV soiling model (e.g., the soiling model 160 of FIG. 1) is executed with a first plurality of parameter sets using as input wash data to generate first predicted energy loss data. As discussed herein, the wash data includes rainfall data and/or manual cleaning data. The plurality of parameter sets each define how cleaning events are determined based on the rainfall data. In an example, each of the parameter sets includes a rain accumulation period and a rain cleaning threshold, where a cleaning event occurs when an amount of rain defined by the rain cleaning threshold is received within an amount of time defined by the rain accumulation period. Thus, different parameter sets applied to the rainfall data result in different cleaning events, resulting in different predicted energy loss data (e.g., soiling losses).

In some implementations, the method 600 includes initializing the first plurality of parameter sets using pseudo-random numbers. In some implementations, the first plurality of parameter sets are the result of prior iterations of optimizing parameter sets. As discussed herein, any number of iterations can be used to generate optimized parameter sets. In an example, FIG. 5 shows how approximately ten iterations of parameter set optimization resulted in parameter sets with a stable amount of error.

At operation 620, a first set of losses are calculated based on a difference between the first predicted energy loss data and time-series sensor data. The first set of losses may be an average absolute difference between actual soiling losses included in the time-series sensor data and the first predicted energy loss data. As discussed herein, the actual soiling losses can be calculated based on raw sensor data in the time-series sensor data, such as irradiance from a clean sensor and a soiled sensors, or irradiance from a clean sensor and output from a soiled PV array.

At operation 630, the first plurality of parameter sets are ranked based on the first calculated set of losses. The ranking may reflect an accuracy of the PV soiling model when using each of the first plurality of parameter sets.

At operation 640, a subset of the first plurality of parameter sets is selected based on the ranking of the first plurality of parameter sets. In an example, the subset includes the best 10% of the first plurality of parameter sets having the lowest corresponding losses, meaning that the subset caused the PV soiling model to more accurate than the remaining parameter sets in the plurality of parameter sets. In an example, the first plurality of parameter sets includes one hundred parameter sets and the subset includes the ten parameter sets that had the lowest corresponding losses.

At operation 650, a parameter-tuning model is executed using as input the subset of the first plurality of parameter sets to generate a second plurality of parameter sets. The parameter-tuning model can be a derivative-free optimization model. In an example, the parameter-tuning model is a PSO model. In some implementations, the PSO model introduces randomness into the second plurality of parameter sets to avoid converging on a local optimum. Parameters of the PSO model can be tuned to modify how the PSO generates parameter sets. Parameters of the PSO model can include a cognitive parameter, a social parameter, inertia weight, and swarm size. Tuning the parameters of the PSO model affect how parameter sets vary between iterations of generating parameter sets. Tuning the parameters of the PSO model can be done to increase an accuracy and/or speed of the PSO model. In an example, the parameters of the PSO model are tuned based on losses between predicted soiling losses and actual soiling losses to increase an accuracy of the PSO model.

In some implementations, the second plurality of parameter sets includes a number of parameter sets equal to the first plurality of parameter sets. In an example, the first plurality of parameter sets includes one hundred parameter sets, the subset includes ten parameter sets, and the second plurality of parameter sets includes one hundred parameter sets. In this way, the parameter-tuning model can iteratively generate improved pluralities of parameter sets using as input subsets of previous pluralities of parameter sets.

In some implementations, the parameter-tuning model is executed using as input the full first plurality of parameter sets and the ranking to generate the second plurality of parameter sets (i.e., without selecting a subset of the first plurality of parameter sets). The first plurality of parameter sets can be weighted according to the ranking. Weighting the first plurality of parameter sets to give much greater weight to a subset of the first plurality of parameter sets than the remaining parameter sets can effectively function as selecting the subset of the first plurality of parameter sets.

In some implementations, the parameter-tuning model is executed using as input the subset of the first plurality of parameter sets and the ranking of the first plurality of parameter sets, or at least the ranking of the subset. The parameter-tuning model can weight the subset according to their ranking, such that parameter sets that cause the PV soiling model to be more accurate are weighted more heavily than parameter sets that cause the PV soiling model to be less accurate.

At operation 660, the PV soiling model is executed with the second plurality of parameter sets using as input the wash data to generate second predicted energy loss data.

At operation 670, a second set of losses is calculated based on a difference between the second predicted energy loss data and the time-series sensor data.

At operation 680, a data structure is generated including a selected parameter set of the second plurality of parameter sets. In some implementations, the data structure is generated in response to a predetermined number of training iterations being completed (i.e., a predetermined number of cycles of generating parameter sets have been performed). In this way, a training time for the parameter set can be constrained. Additionally, computing resources can be conserved, as using a predetermined number of iterations does not require comparing losses to a predetermined error threshold. In an example, the data structure can be generated to include a currently generated parameter set in response to one hundred iterations being performed, as illustrated in FIG. 5.

In some implementations, the data structure is generated in response to a loss of the second set of losses being below a predetermined error threshold, where the selected parameter set corresponds to the loss that is below the predetermined error threshold. In this way, the data structure includes the selected parameter set which caused the PV soiling model to be accurate enough that the loss was below the predetermined error threshold, indicating that the parameter sets have been optimized to meet the predetermined error threshold. In some implementations, the predetermined error threshold is defined as an average absolute difference between the actual soiling losses from the time-series sensor data and predicted energy loss data. In some implementations, the predetermined error threshold is defined as a difference between lowest errors in subsequent pluralities of parameter sets. In an example, if the lowest error for successive pluralities of parameter sets stabilizes (converges), then it is likely that further modification of parameter sets will not decrease the error, and the selected parameter set is selected from the most recent plurality of parameter sets. In an example, FIG. 5 shows how an error of a PV soiling model (losses) executed using successive parameter sets stabilizes after approximately ten iterations.

In some implementations, the selected parameter set includes at least one of a soiling buildup rate, a rain cleaning threshold, a rain accumulation period, and a grace period. An example of a soiling buildup rate generated by a parameter-tuning model is illustrated in FIG. 3. An example of a rain cleaning threshold generated by a parameter-tuning model is illustrated in FIG. 2. In some implementations, the method 600 includes adjusted the soiling buildup rate based on an average soiling buildup rate for a time period. The parameter-tuning model, in generating the second plurality of parameter sets can adjust soiling buildup rate values based on an average soiling buildup rate value across a time period to avoid sharp changes in soiling buildup rate values. In an example, the parameter-tuning model calculates soiling buildup rate values for each month in a year and then adjusts the calculated monthly soiling buildup rate values to reduced changes between successive months.

In some implementations, the method 600 includes generating a recommendation for one or more manual cleaning events by executing the PV soiling model with the selected parameter set using as input modified manual cleaning data. By executing the PV soiling model with the selected parameter set, the error or loss is known, allowing for accurate prediction of an impact of manual cleaning events on PV array output. In an example, the PV soiling model is executed with the selected parameter set using as input five different combinations of cleaning dates to determine which combination of cleaning dates results in the greatest PV array output to determine which combination of cleaning dates to recommend. In some implementations, the method 600 includes generating control signals for an automatic cleaning system to implement the recommendation. In an example, the recommendation is used in a process to generate control signals for an a sprinkler system to clean PV arrays to increase an output of the PV arrays. In some implementations, the recommendation is generated in an iterative process, where a cost of cleaning dates is balanced against increased power output. In an example, a fixed cost is used to determine a number of cleaning dates, and the recommendation is based on a combination of cleaning dates including the number of cleaning dates. In an example, several different numbers of cleaning dates are used to generate recommendations, and the resulting power output increases are compared to the respective cost of the numbers of cleaning dates to determine what number of cleaning dates to use and thus which corresponding set of cleaning dates should be recommended. Factors other than cost and power output may be considered in optimizing the number of cleaning dates.

In some implementations, the method 600 includes executing the PV soiling model with the selected parameter set using as input second wash data to generate third predicted energy loss data and applying the third predicted energy loss data to a prediction of PV array output. The second wash data can include forecasted rainfall data for the location of the PV array. The PV soiling model can be executed using the forecasted rainfall data to predict a future amount of soiling to modify the prediction of future PV array output. In this way, the PV soiling model, with the selected parameter set, can be used to accurately predict how soiling will affect future PV array output, allowing for improved control of renewable energy assets and interventions. In an example, batteries can be controlled to store energy to compensate for a predicted future soiling loss.

Figure 7:
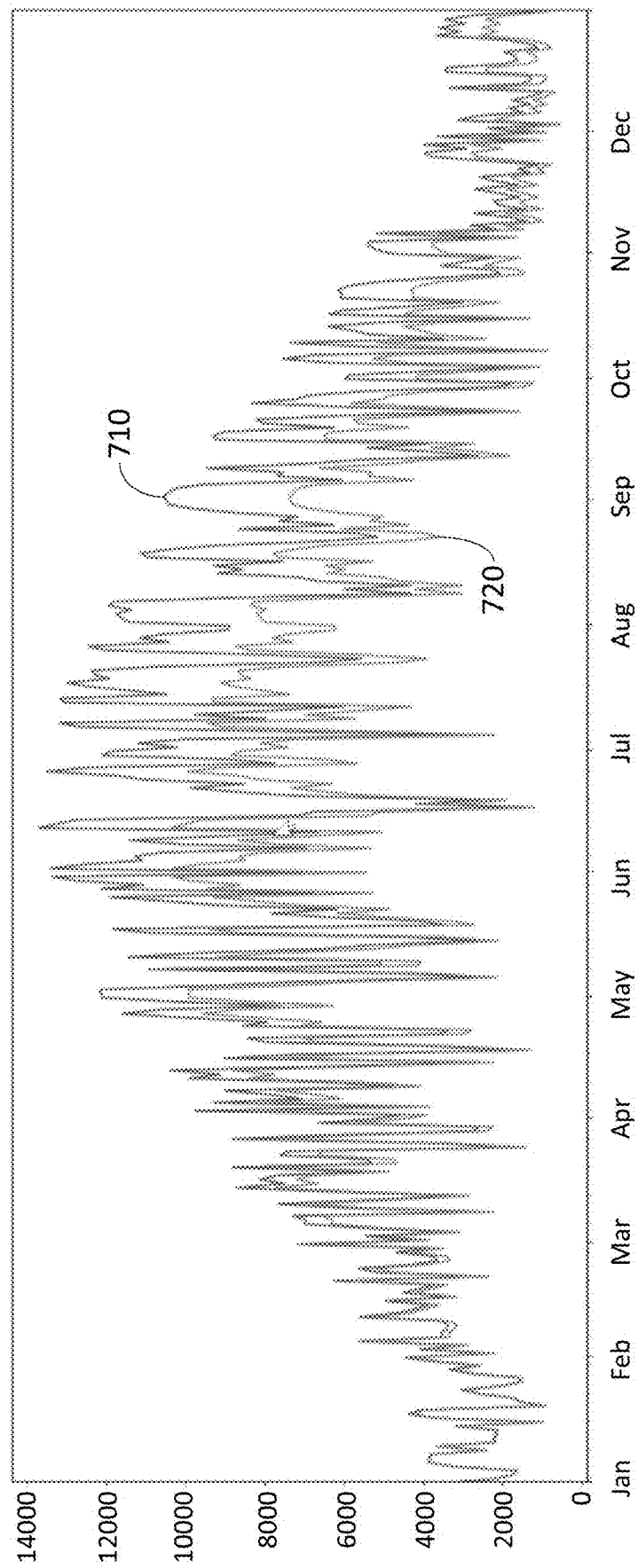
FIG. 7 is an example graph illustrating irradiance and irradiance modified by soiling losses.

FIG. 7 is an example graph 700 illustrating irradiance 710 and adjusted irradiance 720 modified by soiling losses. The soiling losses are predicted by a PV soiling model, such as the soiling model 160 of FIG. 1. The graph 700 illustrates a scenario where there are no cleaning events. Thus, a percentage difference between the irradiance 710 and the adjusted irradiance 720 due to the soiling losses increases over the course of the year, with absolute differences being larger in months with greater irradiance 710. Thus, the percentage difference between the irradiance 710 and the adjusted irradiance 720 is much lower in the first quarter of the year than in the fourth quarter of the year.

Figure 8:
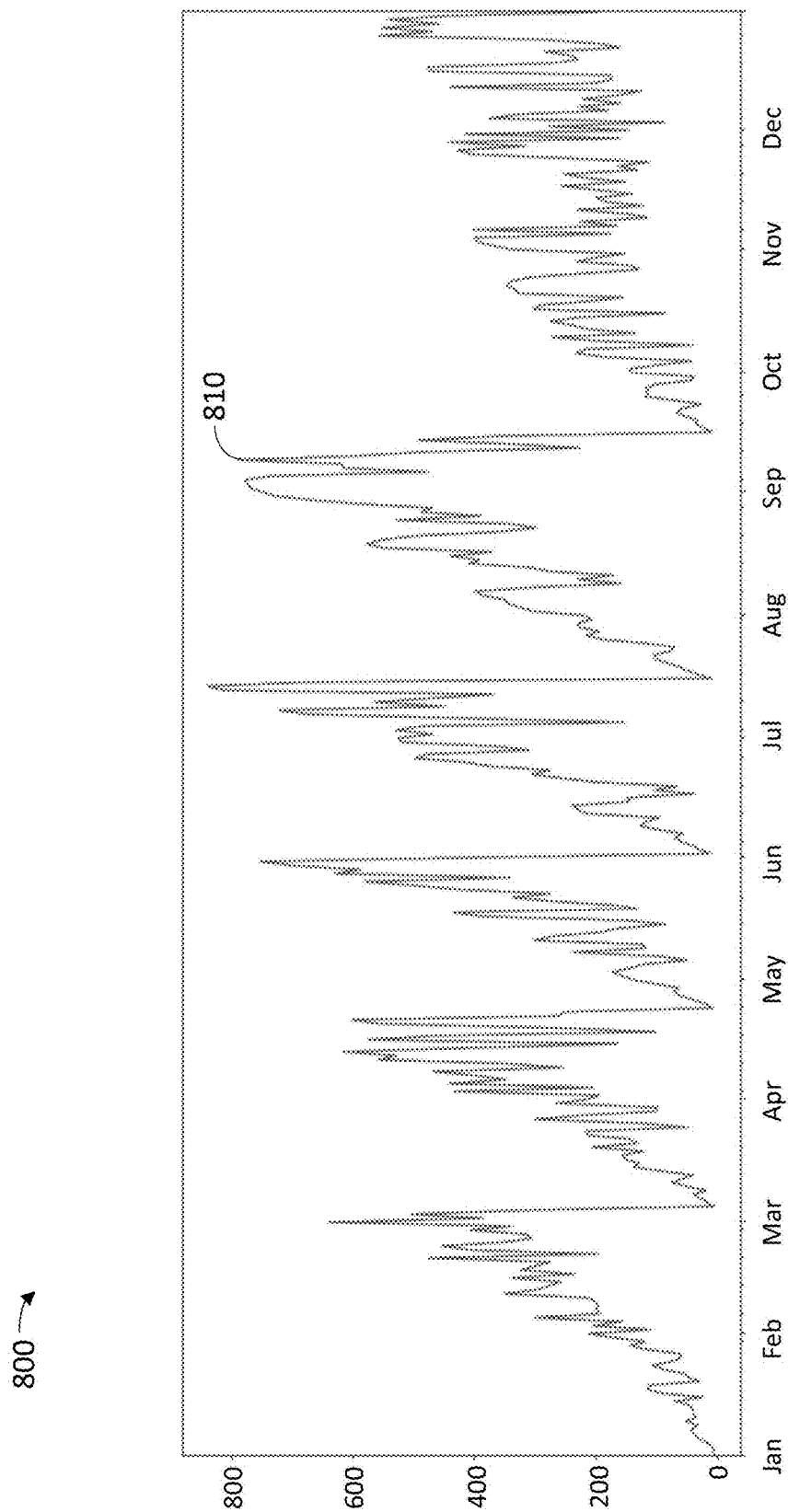
FIG. 8 is an example graph illustrating soiling losses.

FIG. 8 is an example graph 800 illustrating soiling losses 810. The soiling losses 810 may be the predicted soiling loss causing the difference between the irradiance 710 and the adjusted irradiance 720 of FIG. 7, but with cleaning events added to modify the soiling losses 810. The soiling losses 810 can be modified by executing a PV soiling model using modified wash data. In some implementations, optimal cleaning events can be determined by executing the PV soiling model with different combinations of cleaning events. In an example, determining an optimal single cleaning event for a year can be done by executing the PV soiling model 365 times, with a cleaning event on a different day each time. However, this brute force approach is unfeasible for combinations of cleaning events where the dimensionality of the problem increases. Thus, combinations of three or more cleaning events may require a prohibitive amount of computing resources to optimize.

A much more efficient approach to optimizing cleaning events is to use a cleaning optimization model such as the cleaning optimization model 180 of FIG. 1. As discussed herein, the cleaning optimization model iteratively modifies cleaning events based on predicted soiling losses to determine cleaning events that result in lower predicted soiling losses. The cleaning optimization model can be a PSO model that modifies cleaning events based on results (soiling losses) of prior cleaning events. In this way, the PSO model determines optimal (potentially optimal given the metaheuristic approach) cleaning events much more efficiently than the brute force approach.

The soiling losses 810 reflect five cleaning events, where the soiling losses 810 are reduced to approximately zero. As discussed above, five cleaning events would be prohibitively compute-intensive to optimize using the brute force approach, potentially requiring several years to compute while using a PSO model to optimize the five cleaning events can be performed in a matter of seconds using the same computing device. Thus, using the PSO model to optimize the cleaning events greatly improves the functioning of the computer by efficiently optimizing the cleaning events to reduce overall soiling losses.

In some implementations, the cleaning optimization model (e.g., PSO model, machine-learning model) is executed using as input a combination of cleaning dates and the soiling losses associated with the cleaning dates to generate a subsequent combination of cleaning dates. In some implementations, the cleaning optimization model is executed using as input a combination of cleaning dates and a score generated using the soiling losses, the score representing an effectiveness of the combination of cleaning dates. The score can reflect relative reduction in soiling losses relative to other combinations of cleaning dates or absolute reduction in soiling losses relative to no cleaning dates. The subsequent combination of cleaning dates can be used as input to the PV soiling model to determine soiling losses associated with the subsequent combination of cleaning dates. The cleaning optimization model can iteratively generate new combinations of cleaning dates to determine an optimal (or relatively optimal) combination of cleaning dates. In some implementations, the cleaning optimization model generates new combinations of cleaning dates until the soiling losses or scores of successive combinations of cleaning dates converge.

Figure 9:
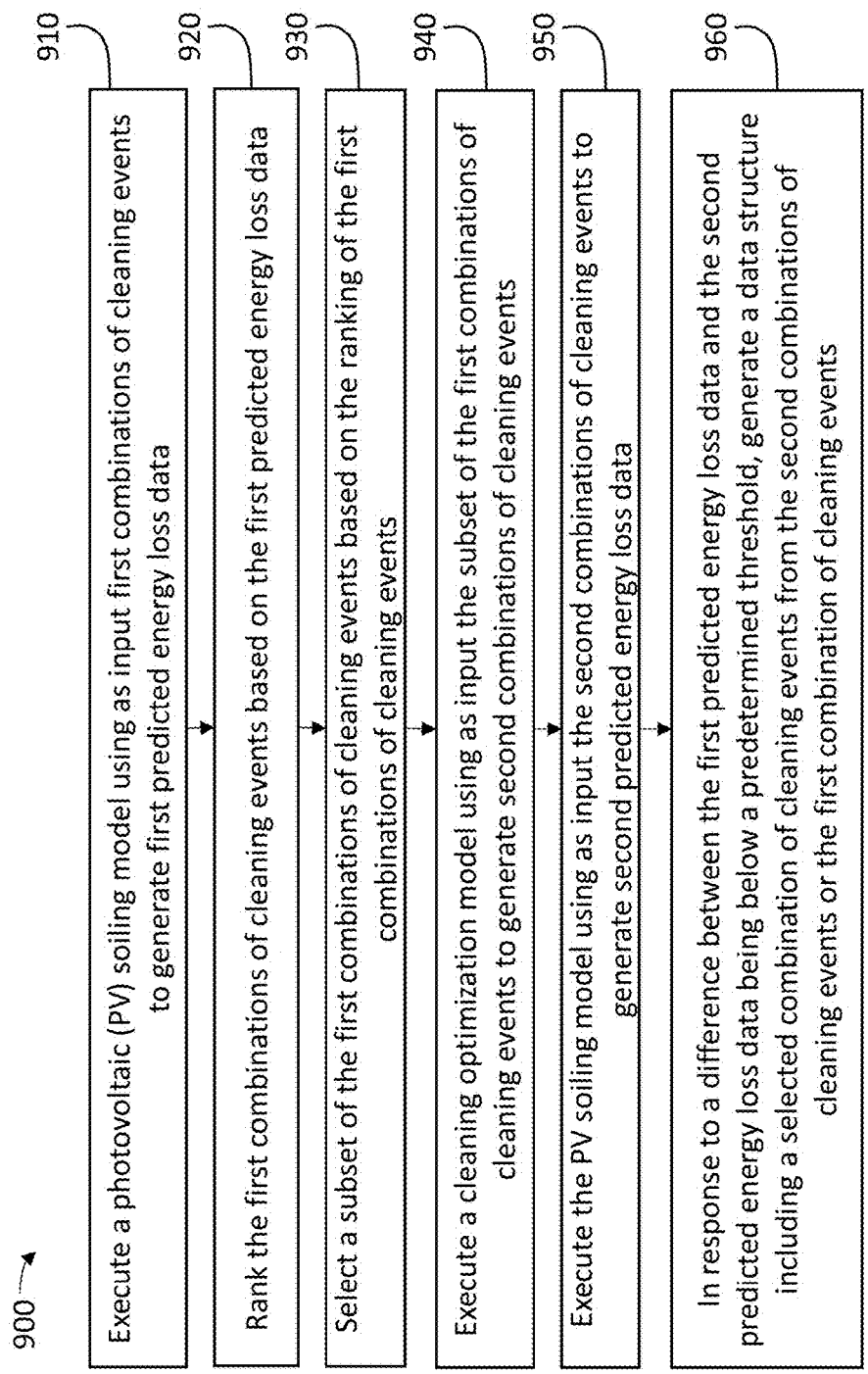
FIG. 9 is a flowchart illustrating operations of an example method for optimizing manual cleaning events.

FIG. 9 is a flowchart illustrating operations of an example method 900 for optimizing manual cleaning events. The method 900 may include more, fewer, or different operations than shown. The operations may be performed in the order shown, in a different order, or concurrently. The method 900 may be performed by one or more components of the system 100 of FIG. 1.

At operation 910, a PV soiling model, such as the soiling model 160 of FIG. 1 is executed using as input first combinations of cleaning events to generate first predicted energy loss data (e.g., soiling losses). In an example, the PV soiling model is executed using as input ten different combinations of five cleaning dates. The first combinations of cleaning events may be randomly generated, or generated based on prior combinations of cleaning events.

At operation 920, the first combinations of cleaning events are ranked based on the first predicted energy loss data. The ranking of the first combinations of cleaning events may be used as a score for relative comparison of the first combinations of cleaning events.

At operation 930, a subset of the first combinations of cleaning events is selected based on the ranking of the first combinations of cleaning events. In an example, the first combinations of cleaning events include ten combinations of cleaning events, and the subset includes the best five combinations corresponding to the lowest soiling losses.

At operation 940, a cleaning optimization model is executed using as input the subset of the first combinations of cleaning events to generate second combinations of cleaning events. In some implementations, the cleaning optimization model is executed using as input the subset and the rankings. The cleaning optimization model can weight the combinations of cleaning events of the subset according to the rankings to increase an impact of better combinations of cleaning events that resulted in lower soiling losses on the generation of the second combinations of cleaning events.

In some implementations, the cleaning optimization model is executed using as input the first combinations of cleaning events and the ranking to generate the second combinations of cleaning events without selecting a subset of the first combinations of cleaning events. The first combinations of cleaning events can be weighted according to the ranking. Weighting the first combinations of cleaning events to give much greater weight to a subset of the first combination of cleaning events than the remaining cleaning events can effectively function as selecting the subset of the first combinations of cleaning events.

At operation 950, the PV soiling model is executed using as input the second combinations of cleaning events to generate second predicted energy loss data (soiling losses).

At operation 960, in response to a difference between the first predicted energy loss data and the second predicted energy loss data being below a predetermined threshold, a data structure is generated including a selected combination of cleaning events from the second combinations of cleaning events or the first combination of cleaning events. The difference between the first predicted energy loss data and the second predicted energy loss data being below a predetermined threshold can indicate convergence of the soiling losses. In some implementations, convergence is detected based on a predetermined number of iterations of combinations of cleaning events having predicted energy loss data that do not vary between successive iterations above a predetermined threshold.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a model stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating an output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:
1. A method comprising:
executing a photovoltaic (PV) soiling model with a first plurality of parameter sets using as input wash data to generate first predicted energy loss data;

calculating a first set of losses based on a difference between the first predicted energy loss data and time-series sensor data;
ranking the first plurality of parameter sets based on the first calculated set of losses;
selecting a subset of the first plurality of parameter sets based on the ranking of the first plurality of parameter sets;
executing a parameter-tuning model using as input the subset of the first plurality of parameter sets to generate a second plurality of parameter sets;
executing the PV soiling model with the second plurality of parameter sets using as input the wash data to generate second predicted energy loss data;
calculating a second set of losses based on a difference between the second predicted energy loss data and the time-series sensor data;
generating a data structure including a selected parameter set of the second plurality of parameter sets;
generating a recommendation for one or more manual cleaning events by executing the PV soiling model with the selected parameter set using as input candidate manual cleaning data; and
causing implementation of the recommendation for the one or more manual cleaning events to improve PV output.

2. The method of claim 1, further comprising initializing the first plurality of parameter sets by generating pseudo-random numbers.

3. The method of claim 1, wherein the loss between the first predicted energy loss data and the time-series sensor data includes an average absolute difference between a predicted percent energy loss and a measured percent energy loss.

4. The method of claim 1, wherein the selected parameter set includes at least one of soiling buildup rates, a rain cleaning threshold, a rain accumulation period, and a grace period.

5. The method of claim 4, further comprising adjusting the soiling buildup rates based on an average soiling buildup rate for a time period.

6. The method of claim 1, wherein the wash data includes rainfall data and manual cleaning data.

7. The method of claim 1, wherein the parameter-tuning model comprises a derivative-free optimization algorithm.

8. The method of claim 1, further comprising:
executing the PV soiling model with the selected parameter set using as input second wash data to generate third predicted energy loss data; and
applying the third predicted energy loss data to a prediction of PV array output.

9. The method of claim 1, wherein the input for the parameter-tuning model to generate the second plurality of parameter sets includes the subset of the first plurality of parameter sets and the ranking of the first plurality of parameter sets.

10. The method of claim 1, further comprising generating soiling model parameters that characterize soiling behavior at a specific photovoltaic (PV) site, wherein the soiling model parameters are compatible with Typical Meteorological Year (TMY) weather data files for subsequent simulation or performance modeling.

11. A non-transitory, computer-readable medium including instructions which, when executed by one or more processors, cause the one or more processors to:

execute a photovoltaic (PV) soiling model with a first plurality of parameter sets using as input wash data to generate first predicted energy loss data;
calculate a first set of losses based on a difference between the first predicted energy loss data and time-series sensor data;
rank the first plurality of parameter sets based on the first calculated set of losses;
select a subset of the first plurality of parameter sets based on the ranking of the first plurality of parameter sets;
execute a parameter-tuning model using as input the subset of the first plurality of parameter sets to generate a second plurality of parameter sets;
execute the PV soiling model with the second plurality of parameter sets using as input the wash data to generate second predicted energy loss data;
calculate a second set of losses based on a difference between the second predicted energy loss data and the time-series sensor data;
generate a data structure including a selected parameter set of the second plurality of parameter sets;
generate a recommendation for one or more manual cleaning events by executing the PV soiling model with the selected parameter set using as input candidate manual cleaning data; and
cause implementation of the recommendation for the one or more manual cleaning events to improve PV output.

12. The non-transitory, computer-readable medium of claim 11, wherein the instructions cause the one or more processors to initialize the first plurality of parameter sets by generating pseudo-random numbers.

13. The non-transitory, computer-readable medium of claim 11, wherein the loss between the first predicted energy loss data and the time-series sensor data includes an average absolute difference between a predicted percent energy loss and a measured percent energy loss.

14. The non-transitory, computer-readable medium of claim 11, wherein the selected parameter set includes at least one of soiling buildup rates, a rain cleaning threshold, a rain accumulation period, and a grace period.

15. The non-transitory, computer-readable medium of claim 14, wherein the instructions cause the one or more processors to adjust the soiling buildup rates based on an average soiling buildup rate for a time period.

16. The non-transitory, computer-readable medium of claim 11, wherein the wash data includes rainfall data and manual cleaning data.

17. The non-transitory, computer-readable medium of claim 11, wherein the parameter-tuning model comprises a derivative-free optimization algorithm.

18. The non-transitory, computer-readable medium of claim 11, wherein the instructions cause the one or more processors to:
execute the PV soiling model with the selected parameter set using as input second wash data to generate third predicted energy loss data; and
apply the third predicted energy loss data to a prediction of PV array output.

19. The non-transitory, computer-readable medium of claim 11, wherein the input for the parameter-tuning model to generate the second plurality of parameter sets includes the subset of the first plurality of parameter sets and the ranking of the first plurality of parameter sets.

20. The non-transitory, computer-readable medium of claim 11, wherein the instructions cause the one or more processors to generate soiling model parameters that characterize soiling behavior at a specific photovoltaic (PV) site, wherein the soiling model parameters are compatible with Typical Meteorological Year (TMY) weather data files for subsequent simulation or performance modeling.

* * * * *